(12) United States Patent
Hickman et al.

(10) Patent No.: US 8,799,788 B2
(45) Date of Patent: Aug. 5, 2014

(54) PROVIDING A SINGLE INSTANCE OF A VIRTUAL SPACE REPRESENTED IN EITHER TWO DIMENSIONS OR THREE DIMENSIONS VIA SEPARATE CLIENT COMPUTING DEVICES

(75) Inventors: Bob Hickman, Simi Valley, CA (US); Allan D. Jones, Valencia, CA (US)

(73) Assignee: Disney Enterprises, Inc., Burbank, CA (US)

(*) Notice: Subject to any disclaimer, the term of this patent is extended or adjusted under 35 U.S.C. 154(b) by 56 days.

(21) Appl. No.: 13/151,873

(22) Filed: Jun. 2, 2011

(65) Prior Publication Data
US 2012/0311463 A1    Dec. 6, 2012

(51) Int. Cl.
*G06F 3/048* (2013.01)
*G06T 19/00* (2011.01)

(52) U.S. Cl.
CPC ..................................... *G06T 19/00* (2013.01)
USPC ............................................. 715/757; 463/42

(58) Field of Classification Search
CPC ... G06T 19/00; A63F 13/12; A63F 2300/407; G07F 17/32
USPC ........ 715/757, 748; 463/9, 31, 32, 33, 35, 42, 463/43
See application file for complete search history.

(56) References Cited

U.S. PATENT DOCUMENTS

| | | | | |
|---|---|---|---|---|
| 7,454,715 B2* | 11/2008 | Chen et al. | | 715/850 |
| 2005/0221880 A1* | 10/2005 | Kando | | 463/9 |
| 2008/0141175 A1* | 6/2008 | Sarna et al. | | 715/848 |
| 2008/0280684 A1* | 11/2008 | McBride et al. | | 463/42 |
| 2009/0005139 A1* | 1/2009 | Morimoto | | 463/6 |
| 2009/0005140 A1* | 1/2009 | Rose et al. | | 463/7 |
| 2010/0146085 A1* | 6/2010 | Van Wie et al. | | 709/220 |
| 2010/0153858 A1* | 6/2010 | Gausman et al. | | 715/757 |
| 2011/0039620 A1* | 2/2011 | Hashimoto | | 463/36 |
| 2011/0077080 A1* | 3/2011 | Meer | | 463/32 |

FOREIGN PATENT DOCUMENTS

EP    2530652    12/2012

OTHER PUBLICATIONS

Kray, Christian, et al., "Presenting Route Instructions on Mobile Devices", *International Conference on Intelligent User Interfaces*, retrieved from the Internet: URL:http://reference.kfump.edu.sa/content/p/r/presenting_route_instructions_on_mobile_54520.pdf, retrieved on Oct. 8, 2012, XP55040252, Jan. 12, 2003, 8 pages.
"The Maze War 30 Year Retrospective at the DigiBarn", unknown, retrieved from the Internet: <URL:http://www.digibarn.com/collections/games/xerox-maze-war/index.html>, retrieved on Oct. 8, 2012, XP55040247, Feb. 19, 2006, 6 pages.

* cited by examiner

Primary Examiner — Omar Abdul-Ai
Assistant Examiner — Anil Bhargava
(74) Attorney, Agent, or Firm — Pillsbury Winthrop Shaw Pittman LLP

(57) ABSTRACT

A single instance of a virtual space may be provided that can be simultaneously represented in at least two dimensions or three dimensions on separate client computing devices. Virtual space information used to facilitate presentation of the virtual space may be agnostic as to whether the virtual space will be represented in two or three dimensions. That is, the same virtual space information may be sent to one or more client computing platforms regardless of the dimensionality of virtual space representations presented by any given client computing platform. A determination may be made at individual client computing platforms as to whether to present the virtual space representation in two dimensions or three dimensions based on one or more metrics associated with the individual client computing platforms. Such metrics may include a computing power of the one or more processors, a communication bandwidth, a screen size, and/or other metrics.

14 Claims, 2 Drawing Sheets

PROVIDING A SINGLE INSTANCE OF A VIRTUAL SPACE REPRESENTED IN EITHER TWO DIMENSIONS OR THREE DIMENSIONS VIA SEPARATE CLIENT COMPUTING DEVICES

FIELD OF THE INVENTION

The invention relates to broadening the accessibility of a virtual space by enabling two-dimensional or three-dimensional presentation of a single instance of the virtual space via separate client computing devices such that users can interact with each other regardless of the dimensionality of the virtual space they interface with.

BACKGROUND

Conventionally, virtual spaces (e.g., virtual worlds, video games, and/or other virtual spaces) are represented in either two dimensions or three dimensions, but not both. A virtual space represented in three dimensions may exclude users on low-powered devices, leaving only those with capable hardware to enjoy a rich experience in such a virtual space. On the other hand, a virtual space represented in two dimensions allows inclusion of users with low-powered devices, but sacrifices the experience of users with more capable devices and constrains the overall richness of the virtual space.

SUMMARY

One aspect of the invention relates to a system and method enabling two-dimensional or three-dimensional presentation of a single instance of a virtual space via separate client computing devices. This may broaden the accessibility of the virtual space. As a result, users may be able to interact with each other regardless of the dimensionality of the virtual space they interface with. As another, non-limiting example, a single user may access a three-dimensional representation of the instance of the virtual space on a client computing device, and may access a two-dimensional representation of the instance of the virtual space on a less sophisticated client computing device (e.g., a mobile device).

The system may include a virtual space server. The virtual space server may be configured to communicate with one or more client computing platforms via one or more communication channels. The virtual space server may be configured to execute one or more computer program modules. The computer program modules may include one or more of a virtual space module, a user module, a path determination module, and/or other modules.

The virtual space module may be configured to implement an instance of a virtual space and determine visual representations of the virtual space. Virtual space information configured to enable presentation of such representations may then be communicated from the virtual space server to one or more client computing platforms for presentation to users. The virtual space information determined and transmitted to a given client computing platform may correspond to and/or include a user character being controlled by a user via the given client computing platform.

The user module may be configured to access and/or manage one or more user profiles associated with users of the system. The user profiles may include, for example, information identifying users within the virtual space, virtual space account information, virtual space usage information, and/or other information related to users. The one or more user profiles may include information stored by the virtual space server, one or more client computing platforms, and/or other storage locations.

The path determination module may be configured to determine paths on which user characters associated with users viewing the two-dimensional representation of the virtual space will follow in the three-dimensional representation of the virtual space. The path determination module is described further below.

Individual ones of the client computing platforms may be configured to execute one or more computer program modules. The computer program modules may include one or more of a communications module, a dimensionality determination module, a presentation module, a destination module, and/or other modules.

The communications module may be configured to receive virtual space information, such as from the virtual space server. The communications module may be configured to transmit information to one or more components of the system.

The dimensionality determination module may be configured to determine whether to present the virtual space representation in two dimensions or three dimensions based on one or more metrics associated with a given client computing platform, user preferences, user selectable settings, and/or other factors. Such metrics may include, for example, a computing power of a given client computing platform, a communication bandwidth associated with a given client computing platform, a screen size associated with a given client computing platform, and/or other metrics or features associated with a given client computing platform.

The presentation module may be configured to facilitate presentation of the virtual space representation via a given client computing platform. In accordance with some implementations, the virtual space representation may be presented in two dimensions or three dimensions based on the determination of the dimensionality determination module.

The destination module may be configured to receive an end-point selection for a user character associated with a given client computing platform. An end-point may be a spatial destination within the virtual space for the user character. The destination module may receive the end-point selection via an interface presented to the user via the client computing platform. The end-point selection may include a coordinate, a place, a set of favorite places, another user character's location, an object (moving and/or stationary), and/or other information indicating a location within the virtual space. The end-point selection may be used by the path determination module of the virtual space server to determine one or more paths for such a user character in a three-dimensional representation of the virtual space, as described further below.

Referring again to the path determination module of the virtual space server, it may be configured to determine one or more paths on which user characters will follow in the three-dimensional representation of the virtual space. The paths may be determined for user characters associated with users viewing two-dimensional representations of the virtual space. In some implementations, individual ones of the one or more paths may be determined automatically, based on the end-point selection received by the destination module of the client computing platform, user settings, user relationships within the virtual space, past usage patterns by a user, and/or based on other information. A given path may be static, dynamic, and/or stochastically selected.

The virtual space information receive from the virtual space server may be agnostic as to whether the virtual space will be represented in two or three dimensions. That is, the same virtual space information may be sent to one or more client computing platforms regardless of the dimensionality of virtual space representations presented by the client computing platform(s). As such, users of two-dimensional representations and three-dimensional representations of the virtual space may interact and participate in a single instance of the virtual space. More specifically, users of a two-dimensional representation of the virtual space may be enabled to interact with users of a three-dimensional representation of the virtual space within the two-dimensional representation of the virtual space. Conversely, users of the three-dimensional representation of the virtual space may be enabled to interact with users of the two-dimensional representation of the virtual space within the three-dimensional representation of the virtual space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
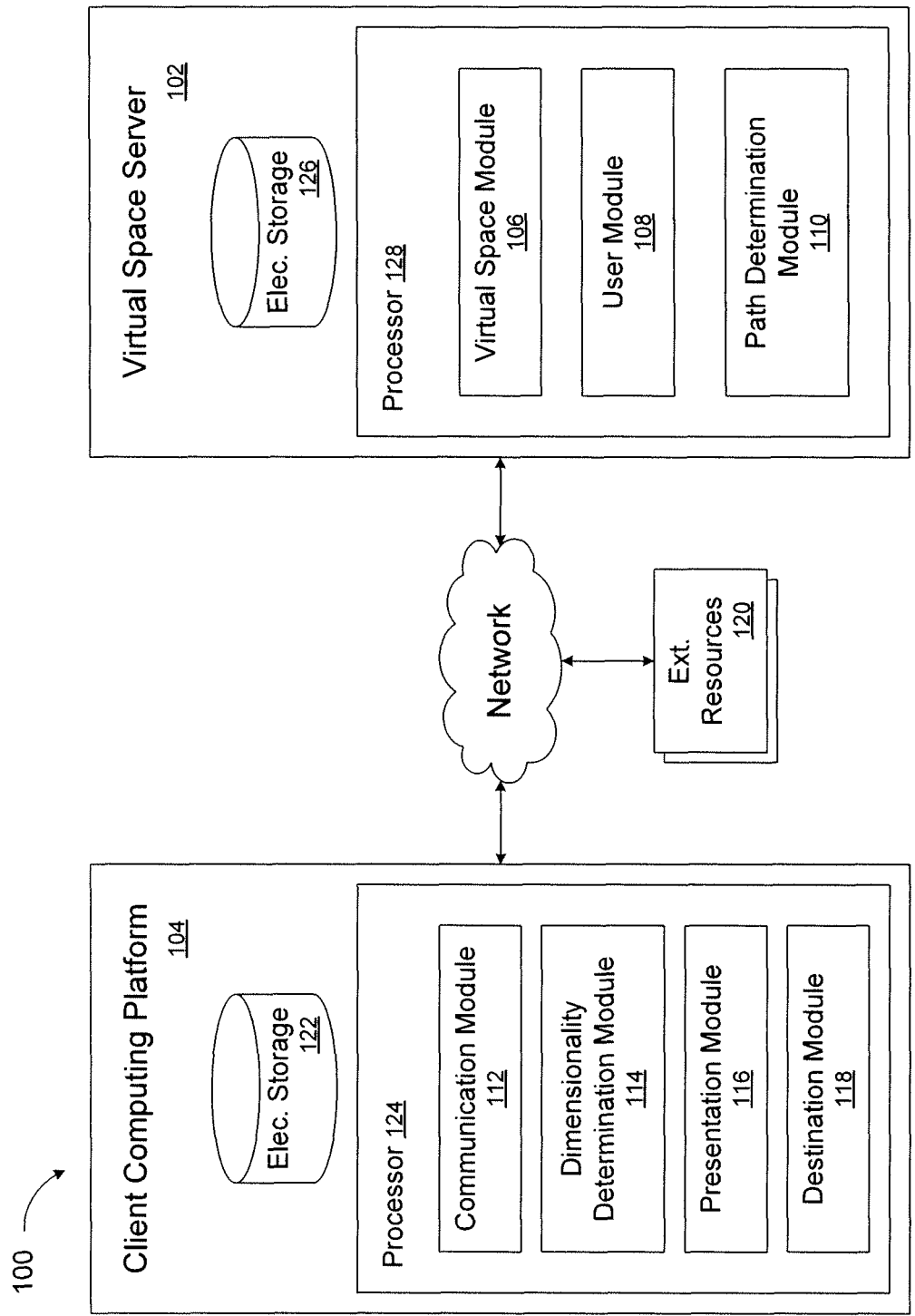
FIG. 1 illustrates a system configured for presenting a single instance of a virtual space in two dimensions or three dimensions via client computing platforms, in accordance with one or more implementations.

FIG. 1 illustrates a system 100 configured for presenting a single instance of a virtual space in two dimensions or three dimensions via client computing platforms, in accordance with one or more implementations. Examples of such a virtual space may include a virtual world, a video game, a social game, and/or other virtual spaces. It will be appreciated that, while the present invention is described herein in context with two- and three-dimensional representations of a virtual space, this is not intended to be limiting as other representations of the virtual space are contemplated. For example, the virtual space may be represented in a textual format. In some implementations, system 100 may include a virtual space server 102. Virtual space server 102 may be configured to communicate with one or more client computing platforms 104 according to a client/server architecture. Users may access system 100 and/or the virtual space via client computing platform 104.

The virtual space server 102 may be configured to execute one or more computer program modules. The computer program modules may include one or more of a virtual space module 106, a user module 108, a path determination module 110, and/or other modules.

The virtual space module 106 may be configured to implement an instance of a virtual space and determine visual representations of the virtual space. Virtual space information configured to enable presentation of such representations may then be communicated (e.g., via streaming, via object/position data, and/or other information) from virtual space server 102 to client computing platforms 104 for presentation to users. It is noteworthy that the virtual space information may be agnostic as to whether the virtual space will be represented in two or three dimensions. That is, the same virtual space information may be sent to client computing platforms 104 regardless of the dimensionality of virtual space representations presented by the client computing platforms 104. The virtual space information determined and transmitted to a given client computing platform 104 may correspond to and/or include a user character being controlled by a user via the given client computing platform 104. The virtual space information determined and transmitted to a given client computing platform 104 may correspond to a location in the virtual space (e.g., the location from which a view of the representation is taken, the location the representation depicts, and/or other locations), a zoom ratio, a dimensionality of objects, a point-of-view, and/or view parameters. One or more of the view parameters may be selectable by the user.

The instance of the virtual space may comprise a simulated space that is accessible by users via client computing platforms 104, which present representations of the virtual space to the users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the simulated space, and/or surface features of a surface or objects that are "native" to the simulated space. In some instances, the topography may describe a surface (e.g., a ground surface) that runs through at least a substantial portion of the simulated space. In some instances, the topography may describe a volume with one or more bodies positioned therein (e.g., a simulation of gravity-deprived space with one or more celestial bodies positioned therein). The instance of the game may be synchronous, asynchronous, and/or semi-synchronous.

The above description of the manner in which representations of the virtual space and/or virtual space information associated therewith are determined by virtual space module 106 is not intended to be limiting. Virtual space module 106 may be configured to express the virtual space in a more limited, or richer, manner. For example, representations determined for the virtual space may be selected from a limited set of graphics depicting an event in a given place within the virtual space. The representations may include additional content (e.g., text, audio, pre-stored video content, and/or other content) that describes particulars of the current state of the place, beyond the relatively generic graphics. For example, a representation may include a generic battle graphic with a textual description of the opponents to be confronted. Other expressions of individual places within the virtual space are contemplated.

Within the instance(s) of the virtual space executed by virtual space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space and/or other objects in the virtual space). The user controlled elements controlled by and/or associated with a given user may be created and/or customized by the given user. The user may have an "inventory" of virtual goods and/or virtual currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or command inputs by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through virtual space server 102 (e.g., through virtual space module 106).

The user module 108 may be configured to access and/or manage one or more user profiles associated with users of the system 100. The one or more user profiles may include information stored by virtual space server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the game), virtual space usage information, demographic information associated with users, interaction history among users in the virtual space, information stated by users, purchase information of users, browsing history of users, a client computing platform identification associated with a user, a phone number associated with a user, and/or other information related to users.

Path determination module 110 may be configured to determine one or more paths on which user characters associated with users of the two-dimensional representation of the virtual space will follow in the three-dimensional representation of the virtual space. Path determination module 110 is described further below.

Individual ones of the client computing platforms 104 may be configured to execute one or more computer program modules. The computer program modules may include one or more of a communications module 112, a dimensionality determination module 114, a presentation module 116, a destination module 118, and/or other modules.

Communications module 112 may be configured to receive virtual space information. The virtual space information may be received from virtual space server 102 and/or other components of system 100. The virtual space information may be configured to facilitate presentation of a representation of a virtual space at individual client computing platforms 104. As such, the virtual space information may include views of the virtual space, object/position information, and/or other information suitable to facilitate presentation of the virtual space. Communications module 112 may be configured to transmit information to one or more components of system 100 including virtual space server 102.

Dimensionality determination module 114 may be configured to determine whether to present the virtual space representation in two dimensions or three dimensions based on one or more metrics associated with a given client computing platform 104, user preferences, user selectable settings, and/or other factors. Such metrics may include, for example, a computing power of a given client computing platform 104, a communication bandwidth associated with a given client computing platform 104, a screen size associated with a given client computing platform 104, and/or other metrics or features associated with a given client computing platform 104.

According to some implementations where communication bandwidth is a metric, determination module 114 may be configured to detect one or more characteristics of a network connection associated with a given client computing platform 104. In some implementations, one or more computer program modules of virtual space server 102 (e.g., virtual space module 106) may be configured to detect one or more characteristics of the network connection associated with the given client computing platform 104. Such characteristics may include whether bandwidth (i.e., data transfer rate) is metered by a service provider, whether a quantity of data transfer is metered by a service provider, a type of connection associated with a given client computing device 104, and/or other characteristics associated with the network connection. Examples of types of connections may include cellular, WiFi, and/or other types of connections. In some implementations, virtual space server 102 may be configured to dynamically and/or statically adjust an amount and/or rate of data transferred to a given client computing platform 104 to compensate for one or more characteristics of the network connection. For example, virtual space server 102 may send less data to a particular client computing platform 104 in order to decrease bandwidth usage. In some implementations, a client computing platform 104 may disregard a portion of data sent by virtual space server 102.

As mentioned above, the virtual space information received by client computing platform 104 may be agnostic as to whether the virtual space will be represented in two or three dimensions. That is, the same virtual space information may be sent to one or more client computing platforms 104 regardless of the dimensionality of virtual space representations presented by the client computing platform(s) 104. As such, users of two-dimensional representations and three-dimensional representations of the virtual space may interact and participate in a single instance of the virtual space. More specifically, users of a two-dimensional representation of the virtual space may be enabled to interact with users of a three-dimensional representation of the virtual space within the two-dimensional representation of the virtual space. Conversely, users of the three-dimensional representation of the virtual space may be enabled to interact with users of the two-dimensional representation of the virtual space within the three-dimensional representation of the virtual space.

It is appreciated that the manners described herein for determining the dimensionality of virtual space representations presented by a given client computing platform 104 is not intended to be limiting as other manners are contemplated. For example, in some implementations, one or more hardware devices of a given client computing platform 104 may determine the dimensionality of a virtual space representation. This might be loosely analogous to a color television broadcast where color television sets present the broadcast in color, while black and white television sets present the broadcast in black and white, even though the same broadcast was received by both.

Presentation module 116 may be configured to facilitate presentation of the virtual space representation via client computing platform 104. Such presentation may be performed in conjunction with a display device associated with client computing platform 104. In accordance with some implementations, the virtual space representation may be presented in two dimensions or three dimensions based on the determination of dimensionality determination module 114. As discussed above, the determination as to the dimensionality of the virtual space representation may be achieved by means other than dimensionality determination module 114.

Destination module 118 may be configured to receive an end-point selection for a user character associated with a given client computing platform 104. An end-point may be a spatial destination within the virtual space for the user character. The destination module 118 may receive the end-point selection via an interface presented to the user via the client computing platform 104. The end-point selection may include a coordinate, a place, a set of favorite places, another user character's location, an object (moving and/or stationary), and/or other information indicating a location within the virtual space. The end-point selection and/or information associated therewith may be communicated from client computing platform 104 to virtual space server 102. The end-point selection may be used by the path determination module 110 of the virtual space server 102 to determine one or more paths for such a user character in a three-dimensional representation of the virtual space, as described further below.

Referring again to path determination module 110 of the virtual space server 102, it may be configured to determine one or more paths on which user characters will follow in the three-dimensional representation of the virtual space. The paths may be determined for user characters associated with users viewing two-dimensional representations of the virtual space. In some implementations, individual ones of the one or more paths may be determined automatically, based on the end-point selection received by destination module 118 of the client computing platform 104, user settings, user relationships within the virtual space, past usage patterns by a user, and/or based on other information. A given path may be static, dynamic, and/or stochastically selected.

In some implementations, virtual space server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which virtual space server 102, client computing platforms 104, and/or external resources 120 may be operatively linked via some other communication media.

The external resources 120 may include sources of information, hosts and/or providers of virtual spaces outside of system 100, external entities participating with system 100, and/or other resources. In some implementations, some or all of the functionality attributed herein to external resources 120 may be provided by resources included in system 100.

A given client computing platform 104 may include electronic storage 122, one or more processors 124, and/or other components. Client computing platform 104 may include communication lines, or ports to enable the exchange of information with a network and/or other computing platforms. Illustration of client computing platform 104 in FIG. 1 is not intended to be limiting. Client computing platform 104 may include a plurality of hardware, software, and/or firmware components operating together to provide the functionality attributed herein to client computing platform 104. By way of non-limiting example, the given client computing platform 104 may include one or more of a desktop computer, a laptop computer, a handheld computer, a NetBook, a Smartphone, a gaming console, and/or other computing platforms.

Electronic storage 122 may comprise electronic storage media that electronically stores information. The electronic storage media of electronic storage 122 may include one or both of system storage that is provided integrally (i.e., substantially non-removable) with client computing platform 104 and/or removable storage that is removably connectable to client computing platform 104 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 124, information received from client computing platform 104, information received from virtual space server 102, and/or other information that enables client computing platform 104 to function as described herein.

Processor(s) 124 may be configured to provide information processing capabilities in client computing platform 104. As such, processor 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include a plurality of processing units. These processing units may be physically located within the same device, or processor 124 may represent processing functionality of a plurality of devices operating in coordination. The processor 124 may be configured to execute modules 112, 114, 116, 118, and/or other modules. Processor 124 may be configured to execute modules 112, 114, 116, 118, and/or other modules by software; hardware; firmware; some combination of software, hardware, and/or firmware; and/or other mechanisms for configuring processing capabilities on processor 124.

It should be appreciated that although modules 112, 114, 116, and 118 are illustrated in FIG. 1 as being co-located within a single processing unit, in implementations in which processor 124 includes multiple processing units, one or more of modules 112, 114, 116, and/or 118 may be located remotely from the other modules. The description of the functionality provided by the different modules 112, 114, 116, and/or 118 described below is for illustrative purposes, and is not intended to be limiting, as any of modules 112, 114, 116, and/or 118 may provide more or less functionality than is described. For example, one or more of modules 112, 114, 116, and/or 118 may be eliminated, and some or all of its functionality may be provided by other ones of modules 112, 114, 116, and/or 118. As another example, processor 124 may be configured to execute one or more additional modules that may perform some or all of the functionality attributed below to one of modules 112, 114, 116, and/or 118.

The virtual space server 102 may include electronic storage 126, one or more processors 128, and/or other components. The virtual space server 102 may include communication lines, or ports to enable the exchange of information with a network and/or other computing platforms. Illustration of virtual space server 102 in FIG. 1 is not intended to be limiting. The virtual space server 102 may include a plurality of hardware, software, and/or firmware components operating together to provide the functionality attributed herein to virtual space server 102. For example, virtual space server 102 may be implemented by a cloud of computing platforms operating together as virtual space server 102.

Electronic storage 126 may comprise electronic storage media that electronically stores information. The electronic storage media of electronic storage 126 may include one or both of system storage that is provided integrally (i.e., substantially non-removable) with virtual space server 102 and/or removable storage that is removably connectable to virtual space server 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor 128, information received from virtual space server 102, information received from client computing platforms 104, and/or other information that enables virtual space server 102 to function as described herein.

Processor(s) 128 may be configured to provide information processing capabilities in virtual space server 102. As such, processor 128 may include one or more of a digital processor, an analog processor, a digital circuit designed to process information, an analog circuit designed to process information, a state machine, and/or other mechanisms for electronically processing information. Although processor 128 is shown in FIG. 1 as a single entity, this is for illustrative purposes only. In some implementations, processor 128 may include a plurality of processing units. These processing units may be physically located within the same device, or processor 128 may represent processing functionality of a plurality of devices operating in coordination. The processor 128 may be configured to execute modules 106, 108, 110, and/or other modules. Processor 128 may be configured to execute modules 106, 108, 110, and/or other modules by software; hardware; firmware; some combination of software, hardware, and/or firmware; and/or other mechanisms for configuring processing capabilities on processor 128.

It should be appreciated that although modules 106, 108, and 110 are illustrated in FIG. 1 as being co-located within a single processing unit, in implementations in which processor 128 includes multiple processing units, one or more of modules 106, 108, and/or 110 may be located remotely from the other modules. The description of the functionality provided by the different modules 106, 108, and/or 110 described below is for illustrative purposes, and is not intended to be limiting, as any of modules 106, 108, and/or 110 may provide more or less functionality than is described. For example, one or more of modules 106, 108, and/or 110 may be eliminated, and some or all of its functionality may be provided by other ones of modules 106, 108, and/or 110. As another example, processor 128 may be configured to execute one or more additional modules that may perform some or all of the functionality attributed below to one of modules 106, 108, and/or 110.

Figure 2:
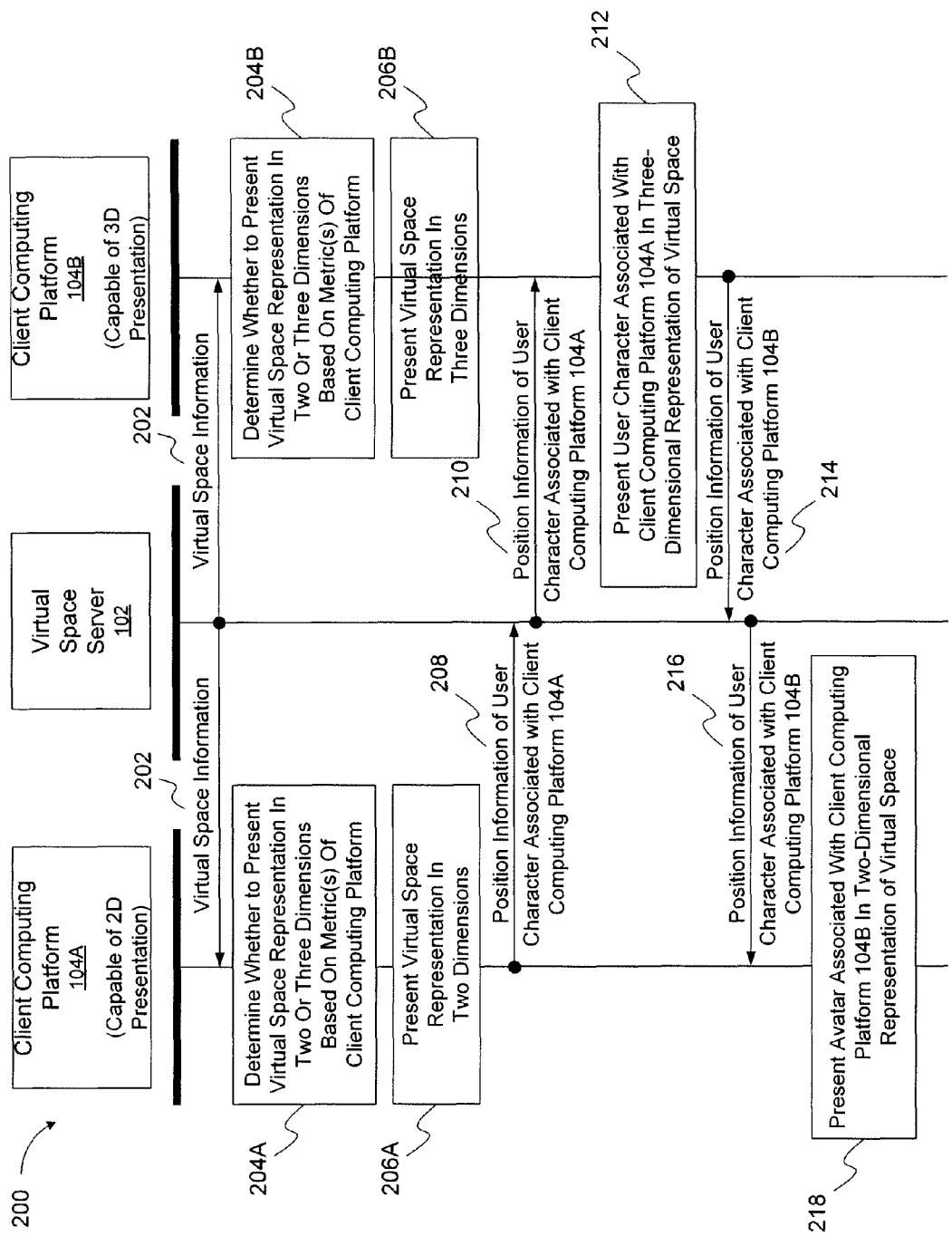
FIG. 2 illustrates a method for presenting a single instance of a virtual space in two dimensions or three dimensions via client computing platforms, in accordance with one or more implementations.

FIG. 2 illustrates a method 200 for presenting a single instance of a virtual space in two dimensions or three dimensions via client computing platforms, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At operation 202, virtual space information may be provided from virtual space server 102 to a plurality of client computing platforms 104. The virtual space information may be configured to allow individual ones of the plurality of client computing platforms to provide a virtual space representation to users associated with the individual ones of the plurality of client computing platforms. FIG. 2 illustrates the virtual space information being received by client computing platform 104A, which is capable of presenting the virtual space in two dimensions, and by client computing platform 104B, which is capable of presenting the virtual space in three dimensions. The virtual space information received by both client computing platform 104A and client computing platform 104B may be the same. In some implementations, operation 202 may be performed via user module 106 of virtual space server 102 and/or communications module 112 of individual client computing platforms 104.

At operation 204A, a determination may be made at client computing platform 104A as to whether to present the virtual space in two or three dimensions based on metrics associated with client computing platform 104A. At operation 204B, a determination may be made at client computing platform 104B as to whether to present the virtual space in two or three dimensions based on metrics associated with client computing platform 104B. Operations 204A and 204B may be performed by dimensionality determination module 114 of client computing platform 104A and client computing platform 104B, respectively, in accordance with some implementations.

At operation 206A, a two-dimensional virtual space representation may be presented via client computing platform 104A, while at operation 206B, a three-dimensional virtual space representation may be presented via client computing platform 104B. Operations 206A and 206B may be performed by presentation module 116 of client computing platform 104A and client computing platform 104B, respectively, according to some implementations.

At operation 208, position information of a user character associated with client computing platform 104A may be communicated from client computing platform 104A to virtual space server 102. In some implementations, operation 208 may be performed by communications module 112 of client computing platform 104A.

At operation 210, the position information of the user character associated with client computing platform 104A may be communicated from virtual space server 102 to client computing platform 104B. Operation 208 may be performed by user module 106 of virtual space server 102 and/or by communications module 112 of client computing platform 104B, in accordance with some implementations.

At operation 212, the user character associated with client computing platform 104A may be presented in the three-dimensional virtual space representation at client computing platform 104B. Operation 212 may be performed by presentation module 116 of client computing platform 104B, in some implementations.

At operation 214, position information of a user character associated with client computing platform 104B may be communicated from client computing platform 104B to virtual space server 102. In some implementations, operation 214 may be performed by communications module 112 of client computing platform 104B.

At operation 216, the position information of the user character associated with client computing platform 104B may be communicated from virtual space server 102 to client computing platform 104A. Operation 216 may be performed by user module 106 of virtual space server 102 and/or by communications module 112 of client computing platform 104A, in accordance with some implementations.

At operation 218, the user character associated with client computing platform 104B may be presented in the two-dimensional virtual space representation at client computing platform 104A. Operation 218 may be performed by presentation module 116 of client computing platform 104A, in some implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method for simultaneously presenting a single instance of a virtual space in two dimensions via some client computing platforms and in three dimensions via other client computing platforms such that users of all the computing platforms can interact with each other in the virtual space regardless of the dimensionality of representations of the virtual space on their respective client computing platforms, the method being performed by one or more processors configured to execute computer program instructions, the method comprising:

using one or more processors to provide virtual space information associated with a single instance of a virtual space to client computing platforms including a first group of client computing platforms and a second group of client computing platforms, the single instance of the virtual space being simultaneously presented via all of the client computing platforms, the single instance of the virtual space being represented in two-dimensions via the first group of client computing platforms based on one or more metrics associated with the first group of client computing platforms, the single instance of the virtual space being represented in three-dimensions via the second group of client computing platforms based on one or more metrics associated with the second group of client computing platforms;

wherein the first group of client computing platforms enable users to interact with users of the second group of client computing platforms via the two-dimensional representation of the single instance of the virtual space presented via the first group of client computing platforms;

wherein the second group of client computing platforms enable users to interact with users of the first group of client computing platforms via the three-dimensional representation of the single instance of the virtual space presented via the second group of client computing platforms; and wherein user characters associated with users of the first group of client computing platforms follow one or more predetermined paths in the three-dimensional representation of the virtual space presented via the second group of client computing platforms.

2. The method of claim 1, wherein the virtual space includes one or both of a virtual world and/or a video game.

3. The method of claim 1, wherein the one or more metrics associated with a given group of client computing platforms include one or more of a computing power of the given group of client computing platforms, a communication bandwidth associated with the given group of client computing platforms, or a screen size associated with the given group of client computing platforms.

4. The method of claim 1, wherein individual ones of the one or more predetermined paths are static in the three-dimensional representation of the virtual space.

5. The method of claim 1, wherein individual ones of the one or more predetermined paths are dynamic in the three-dimensional representation of the virtual space.

6. The method of claim 1, wherein individual ones of the one or more predetermined paths are stochastically determined.

7. The method of claim 1, further comprising receiving, at the client computing platform, an end-point selection in the two-dimensional representation of the virtual space, wherein individual ones of the one or more predetermined paths are determined based on the end-point selection.

8. A system for simultaneously presenting a single instance of a virtual space in two dimensions via some client computing platforms and in three dimensions via other client computing platforms such that users of all the computing platforms can interact with each other in the virtual space regardless of the dimensionality of representations of the virtual space on their respective client computing platforms, the system comprising:

one or more processors configured to execute computer program instructions which when executed cause one or more processors to:

provide virtual space information associated with a single instance of a virtual space to client computing platforms including a first group of client computing platforms and a second group of client computing platforms, the single instance of the virtual space being simultaneously presented via all of the client computing platforms, the single instance of the virtual space being represented in two-dimensions via the first group of client computing platforms based on one or more metrics associated with the first group of client computing platforms, the single instance of the virtual space being represented in three-dimensions via the second group of client computing platforms based on one or more metrics associated with the second group of client computing platforms;

wherein the first group of client computing platforms enable users to interact with users of the second group of client computing platforms via the two-dimensional representation of the single instance of the virtual space presented via the first group of client computing platforms;

wherein the second group of client computing platforms enable users to interact with users of the first group of client computing platforms via the three-dimensional representation of the single instance of the virtual space presented via the second group of client computing platforms; and wherein user characters associated with users of the first group of client computing platforms follow one or more predetermined paths in the three-dimensional representation of the virtual space presented via the second group of client computing platforms.

9. The system of claim 8, wherein the virtual space includes one or both of a virtual world and/or a video game.

10. The system of claim 8, wherein the one or more metrics associated with a given group of client computing platforms include one or more of a computing power of the given group of client computing platforms, a communication bandwidth associated with the given group of client computing platforms, or a screen size associated with the given group of client computing platforms.

11. The system of claim 8, wherein individual ones of the one or more predetermined paths are static in the three-dimensional representation of the virtual space.

12. The system of claim 8, wherein individual ones of the one or more predetermined paths are dynamic in the three-dimensional representation of the virtual space.

13. The system of claim 8, wherein individual ones of the one or more predetermined paths are stochastically determined.

14. The system of claim 8, further comprising a destination module configured to receive an end-point selection in the two-dimensional representation of the virtual space, wherein individual ones of the one or more predetermined paths are determined based on the end-point selection.

* * * * *